United States Patent Office 3,222,258
Patented Dec. 7, 1965

3,222,258
METHOD OF PREPARING AMINO ACIDS BY FERMENTATION
Hiroshi Iizuka, Tokyo, Noboru Katsuya, Kanagawa-ken, Isamu Shiio and Kazuo Komagata, Tokyo, and Shin-Ichiro Otsuka, Kazuhiko Yamada, and Ryosuke Ishii, Kanagawa-ken, Japan, assignors to Ajinomoto Co., Inc., Tokyo, Japan
No Drawing. Filed July 15, 1963, Ser. No. 295,196
Claims priority, application Japan, July 14, 1962, 37/29,206
6 Claims. (Cl. 195—29)

This invention relates to the manufacture of amino acids, and more particularly to the production of amino acids by fermentation.

It is known to culture certain microorganisms on nutrient media containing carbohydrates, an assimilable nitrogen source and certain auxiliary nutrients necessary for the growth of the microorganisms cultured, and to obtain amino acids from the culture medium where they accumulate as products of the metabolism of the microorganisms.

Glucose, molasses and starch hydrolyzates are being commonly employed on an industrial scale. Although these materials are in plentiful supply, their cost is subject to wide variations because of variable factors affecting agriculture.

The object of this invention is a method of preparing amino acids by fermentation which does not rely on agricultural products as a principal source of assimilable carbon.

We have found that certain microorganisms are capable of producing amino acids on culture media which contain hydrocarbons or crude hydrocarbon mixtures as the principal source of assimilable carbon.

The hydrocarbons employed in our method are even more widely available than the afore-mentioned agricultural products and their cost is lower and more stable. The microorganisms which we have found capable of metabolizing hydrocarbons can convert a wide range of hydrocarbon compounds to amino acids. Methane and other gaseous hydrocarbons are suitable carbon sources for our method, as are heavy petroleum oils and even solid hydrocarbons.

The microorganisms capable of converting the carbon of hydrocarbons to the carbon chain of amino acids, and of accumulating such amino acids in the culture medium are not limited to any specific family or genus. Suitable strains have been isolated from fungi, yeasts, actinomycetes, and bacteria. The strains of microorganisms which are useful for the method of our invention are readily isolated from other microorganisms by their ability to grow in any one of the culture media listed in Table I.

TABLE I.—ISOLATION MEDIA (a) | G.
--- | ---
Kerosene | 10
$NH_4Cl$ | 2
$Na_2HPO_4 \cdot 12H_2O$ | 1
$KH_2PO_4$ | 1.5
$MgSO_4 \cdot 7H_2O$ | 0.5
NaCl | 2

Distilled water, to make one liter.

(b) | G.
--- | ---
Crude petroleum | 10
$NH_4NO_3$ | 2.5
$Na_2HPO_4 \cdot 12H_2O$ | 1
$KH_2PO_4$ | 1.5
$MgSO_4 \cdot 7H_2O$ | 1.5
$MnCl_2$ | 0.2
$CaCl_2$ | Trace
$FeSO_4 \cdot 7H_2O$ | Trace
$MoSO_4$ | Trace
$CaCO_3$ (separately sterilized) | 5

Distilled water, to make one liter.

(c) | G.
--- | ---
$NH_4Cl$ | 1
$KH_2PO_4$ | 0.5
$MgSO_4 \cdot 7H_2O$ | 0.2
$FeCl_3$ | Trace Distilled water, to make one liter.
Methane and/or propane, to saturation.

(d) One of the above mentioned media containing a small amount of such growth promoting agents as yeast extract, corn steep liquor, meat extract, peptone, protein hydrolyzates, pastes or extracts prepared from crushed animal or vegetal tissue, and the like.

All media are employed at pH 7.2. Their ability to promote selective growth of microorganisms suitable for the method of the invention is not affected when they are incorporated in agar plates. Medium (c) was kept saturated with methane and/or propane by contact with a mixture of equal parts of the gaseous hydrocarbon and of air.

Newly isolated strains of microorganisms from natural sources are conveniently purified by repeated agar plate culture in media of the types listed in Table I. The enrichment culture method is preferably employed with such strains. One of the media of Table I is inoculated with a specimen of a new strain, and the broth of the enrichment culture so produced is subjected to the agar plate purification process after a few days' culturing.

The amino acids formed in the culture media by the microorganisms of the invention are identical with the corresponding naturally occurring amino acids. We have found in the media useful amounts of alanine, aspartic acid, lysine, arginine, tyrosine, leucine, histidine, cystine, isoleucine, valine, phenylalanine, glycine, threonine, tryptophane, proline and serine after carrying out our fermentation method, but other amino acids are produced at least in trace amounts. Some of the microorganisms produce mainly one amino acid, whereas others produce mixtures.

The fermentation media employed consist essentially of a hydrocarbon or a mixture of hydrocarbons as a carbon source, and of otherwise conventional constituents including a nitrogen source, inorganic materials and small amounts of organic growth promoting substances.

The preferred hydrocarbons for use in our method are products and wastes obtained in the refining of crude oil or petroleum but it will be obvious to those skilled in the art that the source of the hydrocarbons is not critical in itself. The liquid petroleum products which are useful carbon sources include kerosene, naphtha, light oil, heavy oil and ligroin. Solid and semi-solid carbon sources include the residues from crude oil distillation and fractionation residues from hydrocarbon mixtures produced by cracking and the like. Natural gas and its component compounds may be employed.

While the properties of the hydrocarbons employed are not critical, as is evident from the wide range of petroleum products that are virtually interchangeably useful for the method of the invention, the several petroleum products referred to in this specification are more specifically described in the following Japanese Industrial Standards (JIS):

Kerosene JIS K–2203, grade No. 1
Light oil JIS K–2204, grade No. 1
Heavy oil JIS K–2205, grade No. 1–2
Liquid paraffin JIS K–900, grade No. 1

It is a common characteristic of these hydrocarbons that they are insoluble, or only very sparingly soluble in aqueous media, yet they are readily metabolized by the microorganisms of our invention in aqueous culture media when sufficiently large surfaces of the carbon sources are contacted with the medium. We finely comminute solid hydrocarbons, and maintain the pulverized solids, as well as liquid and gaseous hydrocarbons in intimate contact with the aqueous medium by vigorous agitation. Gaseous hydrocarbons are distributed in the culture media in mixtures with air in the form of small bubbles. Emulsifiers and other surfactants are sometimes helpful.

The nitrogen sources employed are conventional and include ammonium salts, such as the chloride, sulfate or phosphate, soluble nitrates, such as potassium nitrate, urea, and ammonia in the gaseous state or in aqueous solution. The concentration of the nitrogen source in the culture medium is held within the usual limits of 0.2 percent to 2 percent. It is desirable to limit the concentration of organic nitrogen compounds in the medium to a very low value since they inhibit the conversion of the hydrocarbons when present in more than minimal amounts.

The inorganic compounds added to the medium supply the normally required trace amounts of metal ions and acid radicals. Fermentation is enhanced by the presence of such known growth promoting agents as yeast extracts, corn steep liquor, meat extracts, peptone, protein hydrolyzates, extracts or pastes from crushed animal or vegetal tissue, and the like.

Fermentation is carried out at temperatures at or somewhat above room temperature, typically between 20 and 40 degrees centigrade. The hydrogen ion concentration is held between pH 4 and pH 9. Aerobic conditions are maintained by shaking, agitation or by passing air through the culture medium. Fermentation normally is complete within one to five days. Shaking or other agitation also are needed for proper contact of the medium with the hydrocarbon material and for full utilization of this carbon source.

The hydrogen ion concentration of the medium falls substantially during fermentation because of the production of amino acids and other organic acids from the hydrocarbons. When ammonium salts are employed as a nitrogen source, the consumption of ammonia further lowers the pH. Buffers, such as phosphates, may be employed to maintain optimum pH values but such other alkaline materials as sodium hydroxide, ammonia in the form of the gas or as ammonia water may be used to adjust the pH value. Ammonia or urea not only raise the pH but also provide additional nitrogen.

The amino acids accumulated in the fermentation broth may be recovered by selective adsorption on ion exchange resins, or they may be permitted to crystallize from the broth, as is conventional in itself. The hydrocarbons not metabolized by the fermentation process are readily separated from the aqueous medium and may be returned to the process for use in the next fermentation batch.

The characteristics of strains of microorganisms suitable for the method of our invention are tabulated hereinbelow. The methods used for the determination of these characteristics were those described in the Manual of Microbiological Methods (Society of American Bacteriologists, 1957, McGraw-Hill Book Co. Inc., New York, New York).

Corynebacterium oleophilus Iizuka and Komagata

Rods, 0.8 x 3.0 microns. Coccoid forms and branching are rarely observed. Spore not formed. Non-motile. Not acid-fast. Gram-positive.

Nutrient agar colonies: Circular, smooth or finely wrinkled, raised to convex, entire, light rose color, opaque, butyrous.

Nutrient agar slant: Moderate growth, filiform, glistening or dull, smooth or wrinkled, light rose color.
Nutrient broth: Fragile pellicle.
Nutrient gelatin stab: No liquefaction.
Milk: Unchanged.
B.C.P. milk: Alkaline, not peptonized.
Potato: Moderate growth.
Nitrates are not reduced to nitrite.
(Variation: Some strains reduce nitrate to nitrite).
Nitrate respiration: Negative.
Indole not produced.
Acetylmethyl carbinol not produced.
Hydrogen sulfide not produced.
Starch not hydrolyzed.
Neither acid nor gas are produced from glycerol, xylose, glucose, sucrose, lactose and starch.
Ethanol, glycerol, glucose, gluconate, 2-keto-gluconate, 5-keto-gluconate, citrate, succinate, and p-hydroxy-benzoate are not utilized as a sole source of carbon.
Kerosene, n-decane, n-undecane, n-dodecane, n-tetradecane, and n-cetane are utilized as a sole source of carbon.
Optimum temperature: 25° to 30° C.
Scant growth or no growth at 37° C.
Catalase: Positive.
Habitat: Soil.

Corynebacterium hydrocarboclastus Iizuka and Komagata

Rods, 0.8 x 3.0 microns. Coccoid forms and branching are rarely observed. Spore not formed. Non-motile. Not acid-fast. Gram-positive.

Nutrient agar colonies: Circular, smooth or finely wrinkled, raised to convex, entire, light rose color, opaque, butyrous.

Nutrient agar slant: Moderate growth, filiform, glistening or dull, smooth or wrinkled, light rose color.
Nutrient broth: Fragile pellicle.
Nutrient gelatin stab: No liquefaction.
Milk: Unchanged.
B.C.P. milk: Alkaline, not peptonized.
Potato: Moderate growth.
Nitrates are not reduced to nitrites.
Nitrate respiration: Negative.
Indole not produced.
Acetylmethyl carbinol not produced.
Hydrogen sulfide produced.
(Variation: Some strains do not produce $H_2S$.)
Starch not hydrolyzed. (Variation: Some strains hydrolyze starch.)
Acid but no gas from glucose.
Aerobically acid is produced from glucose according to Hugh and Leifson's method.
No acid nor gas from xylose, sucrose, lactose and starch.
Glucose, gluconate, citrate, succinate, p-hydroxybenzoate and protocatechuate are utilized as a sole source of carbon. Utilization of benzoate varies with strains. Salicylate, m-hydroxy-benzoate, gentisate and anthranilate are not utilized as a sole source of carbon.
Kerosene, n-decane, n-undecane, n-dodecane, n-tetradecane, and n-cetane are utilized as a sole source of carbon.
Optimum temperature: 25° C. to 30° C. Scant growth or no growth at 37° C.
Catalase: Positive.
Habitat: Soil.
Cory. oleophilus and Cory. hydrocarboclastus were identified as new species by Iizuka and Komagata, and reported to the 188th meeting of the Kanto branch of the Agricultural Chemical Society of Japan.

Brevibacterium acetylicum M–101

The taxonomical characteristics of this strain are identical with those of Brevibacterium acetylium which are described in Bergey's Manual of Determinative Bacteriology, 7th edition.

The following characteristics were newly observed by us:
Acetylmethyl carbinol not produced.
Hydrogen sulfide produced.
No acid or gas are produced from glycerol, xylose, glucose, lactose, sucrose, and starch. However, acid but no gas is aerobically produced from glucose according to Hugh and Leifson's method.
Glucose, gluconate, citrate, succinate, p-hydroxy-benzoate and protocatechuate are utilized as a sole source of carbon, but benzoate, salicylate, m-hydroxy-benzoate, gentisate and anthranilate are not utilized.
Kerosene is utilized as a sole source of carbon.
Catalase: Positive.
Habitat: Sea water.

Brevibacterium fulvum A–34

The taxonomical characteristics of this strain are identical with those of *Brevibacterium fulvum* which are described in Bergey's Manual of Determinative Bacteriology, 7th edition. The following characteristics were newly observed by us:
Milk: Blackish brown.
B.C.P. milk: Alkaline, not peptonized.
Indole not produced.
Acetylmethyl carbinol not produced.
Hydrogen sulfide not produced.
Starch hydrolyzed.
Aerobically acid is produced from glucose according to Hugh and Leifson's method.
No acid nor gas from glycerol, xylose, glucose, sucrose, lactose and starch.
Citrate and succinate are utilized as a sole source of carbon, but glucose, gluconate, benzoate, salicylate, m-hydroxy-benzoate, p-hydroxy-benzoate, protocatechuate, gentisate and anthranilate are not utilized.
Kerosene is utilized as a sole source of carbon.
Catalase: Positive.
Habitat: Soil etc.

Achromobacter pestifer S–175

The taxonomical characteristics of this strain are identical with those of *Achromobacter pestifer* which are described in Bergey's Manual of Determinative Bacteriology, 7th edition. The following characteristics were newly observed by us:
B.C.P. milk: Alkaline.
Nitrates are not reduced to nitrites.
Nitrate respiration: Negative.
Hydrogen sulfide produced.
Aerobically acid and gas are not produced from glucose according to Hugh and Leifson's method.
Glucose, gluconate, citrate, succinate, benzoate, salicylate, m-hydroxy-benzoate, p-hydroxy-benzoate, protocatechuate, gentisate and anthranilate are not utilized as a sole source of carbon.
Kerosene is utilized as a sole source of carbon.
Catalase: Positive.
Habitat: Soil.

Brevibacterium cerinus nov. sp. K–129 (ATCC No. 15,112)

Rods, 0.6~0.8 x 1.0~1.5 microns. Spore not formed. Non-motile. Not acid fast. Gram-positive.
Nutrient agar colonies: Circular, smooth, raised, entire, pale yellowish brown, opaque, butyrous.
Nutrient gelatin stab: No liquefaction.
Milk: Unchanged.
B.C.P. milk: Alkaline.
Nitrates are reduced to nitrites.
Nitrate respiration: Negative.
Indole not produced.
Acetylmethyl carbinol produced.
Hydrogen sulfide produced.
Starch hydrolyzed.
No acid nor gas from glycerol, xylose, glucose, sucrose, lactose and starch.
Acid but no gas is produced from glucose both under aerobical and anaerobical conditions according to Hugh and Leifson's method.
Citrate, succinate and m-hydroxy-benzoate are utilized as a sole source of carbon, but glucose, gluconate, benzoate, salicylate, p-hydroxy-benzoate, protocatechuate and anthranilate are not utilized.
Kerosene is utilized as a sole source of carbon.
Catalase: Positive.
Habitat: Soil, etc.
The strain described above is a member of a new species. The species is not found in Bergey's Manual of Determinative Bacteriology, 7th ed.

Brevibacterium albus nov. sp. S–270 (ATCC No. 15,111)

Rods, 0.4 x 0.8~1.2 microns. Spore not formed. Non-motile. Not acid-fast. Gram-positive.
Nutrient agar colonies: Circular, smooth, convex, entire, opaque, dull yellowish brown, butyrous.
Nutrient gelatin stab: Liquefied.
Milk: Unchanged.
B.C.P. milk: Alkaline.
Nitrates are reduced to nitrites.
Nitrate respiration: Negative.
Indole not produced.
Acetylmethyl carminol not produced.
Hydrogen sulfide produced.
Starch not hydrolyzed.
No acid nor gas from glycerol, xylose, glucose, sucrose, lactose and starch.
Acid is produced aerobically from glucose according to Hugh and Leifson's method.
Gluconate, citrate, m-hydroxy-benzoate, p-hydroxy-benzoate, and gentisate are utilized as a sole source of carbon, but glucose, succinate, benzoate, salicylate, protocatechuate are not utilized.
Kerosene is utilized as a sole source of carbon.
Catalase: Positive.
Habitat: Soil.
The strain described above is a member of a new species. The species is not found in Bergey's Manual of Determinative Bacteriology, 7th edition.

The following examples are further illustrative of the invention, and it will be understood that the invention is not limited thereto. The microorganisms referred to are identified by stock culture numbers of the Institute of Applied Microbiology of Tokyo University, Japan (IAM), and/or by numbers of the American Type Culture Collection (ATCC).

EXAMPLE 1

A medium of the following composition was prepared:

| | |
|---|---:|
| Kerosene _____ g__ | 20 |
| NH$_4$Cl _____ g__ | 2 |
| Na$_2$HPO$_4$.12H$_2$O _____ g__ | 1 |
| KH$_2$PO$_4$ _____ g__ | 0.5 |
| MgSO$_4$.7H$_2$O _____ g__ | 0.5 |
| NaCl _____ g__ | 2 |
| Distilled water _____ liters__ | 1 |

After adjustment of the pH value of the medium to 7.2, 50 ml. portions of the medium were introduced into 500 ml. flasks. The flasks were then sterilized at 115° C. for 10 minutes. The medium in each flask was inoculated with *Corynebacterium oleophilus* Kp6–1414 (ATCC No. 15,108). The culture was carried out at 30° C. with shaking. After 4 days, the culture broth was assayed and an L-glutamic acid content of 85 mg./liter was found.

The broth was separated into three layers by centrifuging. The top layer consisted of residual hydrocarbons and the bottom layer was cell material. L-glutamic acid was recovered from the aqueous layer between the hydrocarbons and the cell material which contained amino acids, inorganic salts, and other soluble substances.

The solution was passed into a column packed with "Amberlite IR–120" resin. The eluate was then passed through a column of "Amberlite IR–4B" until the ash content was substantially reduced. The solution was then passed through a column of "Amberlite IR–400." Glutamic acid adsorbed in this column was eluted with sufficient dilute sodium hydroxyde.

The eluate was neutralized and partly evaporated. The concentrated solution was filtered to remove crystals of sodium chloride. The pH was adjusted to the isoelectric point of glutamic acid (pH 3.2), and glutamic acid was crystallized and collected by filtration. 150 mg. of crystalline L-glutamic acid were recovered from 3 liters of the cultured broth.

EXAMPLE 2

A medium of the following composition was prepared:

| | |
|---|---|
| Kerosene | g.-- 20 |
| $NH_4Cl$ | g.-- 10 |
| $Na_2HPO_4 \cdot 12H_2O$ | g.-- 6.7 |
| $KH_2PO_4$ | g.-- 3.3 |
| $MgSO_4 \cdot 7H_2O$ | g.-- 0.5 |
| NaCl | g.-- 2 |
| $Mn^{++}$ | mg.-- 2 |
| $Fe^{++}$ | mg.-- 2 |
| Distilled water | liters-- 1 |

The pH value was adjusted to 7.2 *Corynebacterium oleophilus* Kp6–1414 (ATCC No. 15,108) was introduced into 50 ml. batches of the medium which had been distributed into 500 ml. flasks and had been sterilized at 115° C. for 10 minutes. The fermentation was carried out at 30° C. with shaking. After 4 days, the culture broth was assayed and a L-glutamic acid content of 16 mg./liter was found, also an L-phenylamine content of 1.8 mg./l.

EXAMPLE 3

A medium having the following composition was prepared:

| | |
|---|---|
| Kerosene | g.-- 20 |
| $NH_4Cl$ | g.-- 5 |
| $Na_2HPO_4$ | g.-- 3.4 |
| $KH_2PO_4$ | g.-- 1.6 |
| $MgSO_4 \cdot 7H_2O$ | g.-- 0.5 |
| NaCl | g.-- 2 |
| Distilled water | liters-- 1 |

The pH value was adjusted to 7.2. 50 ml. batches of this medium were introduced into 500 ml. shaking flasks and sterilized by autoclaving at 115° C. for 10 minutes. The microorganisms described in Table II were respectively employed for inoculating the several batches of the medium. Culture was carried out as described in Example 1. The analytical findings on the culture broth thus obtained are given in Table II.

TABLE II

| Microorganism: | L-glutamic acid found mg./liter |
|---|---|
| *Corynebacterium oleophilus* | |
| Strain Kp10–1399 | 27 |
| Strain K10–1452 | 10 |
| *Corynebacterium hydrocarboclastus* | |
| Strain S–155 | 81 |
| Strain S–179 (ATCC No. 15,109) | 69 |
| Strain M–104 (ATCC No. 15,110) | 281 |
| Strain M–134 | 67 |
| Strain A–137 | 33 |
| *Brevibacterium acetylicum* M–101 | 6 |
| *Brevibacterium fulvum* A–34 | 12 |
| *Brevibacterium albus* S–270 (ATCC No. 15,111) | 16 |
| *Brevibacterium cerinus* K–129 (ATCC No. 15,112) | 6 |

EXAMPLE 4

*Corynebacterium oleophilus* Kp6–1414 was cultured in the same manner as described in Example 3, but $NH_4Cl$ in the medium was replaced by $NaNO_3$ (16 g./l.). After 4 days, the culture broth had an L-glutamic acid content of 14 mg./liter.

EXAMPLE 5

*Corynebacterium oleophilus* Kp6–1414 was cultured in the same manner as described in Example 3, but $NH_4Cl$ in the medium was replaced by 7.6 g./l. $NH_4NO_3$. After 4 days, the culture broth was assayed and 36 mg./l. L-glutamic acid were found.

EXAMPLE 6

A medium of the same composition as described in Example 3 was prepared but 20 grams liquid paraffine were used as a carbon source instead of kerosene.

Separate portions of the medium were inoculated with the microorganisms described in Table III. Culture was carried out in the same manner as described in Example 3. The glutamoic acid contents of the culture broth thus obtained are given in Table III.

TABLE III

| Microorganisms: | L-glutamic acid found, mg./l. |
|---|---|
| *Corynebacterium olephilus*: | |
| Strain Kp6–1414 (ATCC No. 15,108) | 11.7 |
| *Corynebacterium hydrocarboclastus*: | |
| Strain S–155 | 4.3 |
| Strain M–106 | 3.8 |
| Strain M–134 | 5.4 |

EXAMPLE 7

A medium was prepared as described in Example 3 and supplemented with 2 mg./l. manganese ions.

The medium was inoculated with *Corynebacterium oleophilus* Kp6–1414 and cultured in the same manner as described in Example 3. The culture broth was found to contain 14 mg./l. alanine, 3 mg./l. L-aspartic acid, 2 mg./l. L-lysine, and 7 mg./l. L-arginine.

EXAMPLE 8

*Corynebacterium hydrocarboclastus* S–155 was cultured in the manner described in Example 3. The broth was found to contain 7 mg./l. L-tyrosine.

EXAMPLE 9

*Achromobacter pestifer* S–175 was cultured in the manner described in Example 3. The broth contained L-aspartic acid in an amount of 3 mg./l.

EXAMPLE 10

*Corynebacterium hydrocarboclastus* S–155 was cultured as described in Example 4. The broth was found to contain 110 mg./l. L-glutamic acid.

EXAMPLE 11

A medium having the following composition was prepared:

| | |
|---|---|
| Heavy oil petroleum fraction | g.-- 20 |
| $NH_4Cl$ | g.-- 5 |
| $Na_2HPO_4 \cdot 12H_2O$ | g.-- 1.7 |
| $KH_2PO_4$ | g.-- 1.7 |
| $MgSO_4 \cdot 7H_2O$ | g.-- 0.5 |
| NaCl | g.-- 1.5 |
| Riboflavin | mg.-- 0.2 |
| Thiamine chloride | mg.-- 0.1 |
| p-Aminobenzoic acid | mg.-- 0.1 |
| Pyridoxine hydrochloride | mg.-- 0.1 |
| Pyridoxal | mg.-- 0.02 |
| Ca-pantothenate | mg.-- 0.1 |
| Nicotinic acid | mg.-- 0.1 |
| Biotin | mg.-- 0.1 |
| Folic acid | mg.-- 1 |
| Distilled water | liters-- 1 |

The pH value of the medium was adjusted to 7.0.

50 ml. batches of this medium were introduced into 500 ml. shaking flasks and sterilized by autoclaving at 115° C. for 10 minutes. The flasks were inoculated with the microorganisms described in Table IV. Culture was carried out at 30° C. with shaking. After 7 days, each broth was assayed and the L-glutamic acid content stated in Table IV was found.

TABLE IV

| Microorganisms: | L-glutamic acid found, mg./l. |
|---|---|
| Corynebacterium hydrocarboclastus M–104 (ATCC No. 15,110) | 22.0 |
| Pseudomonas ovalis 24-β (IAM No. 1552) | 26.4 |
| Escherichia coli WM309–1 | 20.4 |

EXAMPLE 12

A medium was prepared as described in Example 10 but light oil was used as a carbon source instead of the heavy oil.

The microorganisms described in Table V were introduced into batches of the medium and cultured at 30° C. with shaking. Each broth was assayed and the amino acid contents listed in Table V were found.

TABLE V

| Microorganism | Amino acid | Found, mg./l. | Culture Period, days |
|---|---|---|---|
| Mycobacterium brevicale: | | | |
| Strain P-128 (ATCC No. 15,113). | L-glutamic acid | 13.9 | 4 |
| Strain P-129 | do | 6.9 | 4 |
| Pseudomonas ovalis 24-β (IAM No. 1552). | Alanine | 28.4 | 7 |

EXAMPLE 13

A medium was prepared as described in Example 11, but an equal amount of kerosene was used as a carbon source instead of heavy oil.

The microorganisms described in Table VI were used for inoculating the medium, and were cultured at 30° C. for 4 days. Each culture broth was assayed for its L-glutamic acid content.

TABLE VI

| Microorganisms: | L-glutamic acid, mg./l. |
|---|---|
| Candida lipolytica: | |
| Strain Y–6–4 | 6.2 |
| Strain Y–6–9 | 6.5 |
| Strain Y–6–10 | 9.5 |
| Strain Y–8–3 | 23.4 |
| Strain Y–8–4 | 11.3 |
| Hansenula anomala Y–32–5 | 9.0 |
| Candida tropicalis YO–129 (ATCC No. 15,114) | 22.5 |

EXAMPLE 14

A medium was prepared having the following composition:

| | | |
|---|---|---|
| Kerosene | g | 100 |
| NH$_4$Cl | g | 5 |
| Na$_2$HPO$_4$.12H$_2$O | g | 3.3 |
| KH$_2$PO$_4$ | g | 1.7 |
| MgSO$_4$.7H$_2$O | g | 0.5 |
| NaCl | g | 0.5 |
| Thiamine hydrochloride | mg | 0.1 |
| Riboflavin | mg | 0.2 |
| p-Aminobenzoic acid | mg | 0.1 |
| Pyridoxine hydrochloride | mg | 0.1 |
| Pyridoxal | mg | 0.02 |
| Ca-pantothenate | mg | 0.1 |
| Nicotinic acid | mg | 0.1 |
| Biotin | mg | 0.1 |
| Folic acid | mg | 1 |
| Distilled water | liters | 1 |

The pH value of the medium was adjusted to 7.0.

A 50 ml. batch of this medium was introduced into a 500 ml. shaking flask and sterilized by autoclaving at 115° C. for 10 minutes. The medium was inoculated with Pseudomonas ovalis 80–5 and cultured at 30° C. for 4 days with shaking. The culture broth was assayed and an L-valine content of 21.6 mg./l. was found.

EXAMPLE 15

Brevibacterium acetylicum R–103 was cultured in the same manner as described in Example 3. The culture broth was assayed and an L-threonine content of 1.4 mg./l. was found.

EXAMPLE 16

Corynebacterium hydrocarboclastus M–104 (ATCC No. 15,110) was cultured in the same manner as described in Example 3. The culture broth was assayed and an L-tryptophan content of 1 mg./l. was found.

EXAMPLE 17

A medium having the following composition was prepared:

| | | |
|---|---|---|
| Kerosene | g | 100 |
| NH$_4$Cl | g | 5 |
| Na$_2$HPO$_4$.12H$_2$O | g | 3.4 |
| KH$_2$PO$_4$ | g | 1.6 |
| MgSO$_4$.7H$_2$O | g | 0.5 |
| NaCl | g | 0.5 |
| Riboflavin | mg | 0.2 |
| Thiamine hydrochloride | mg | 0.1 |
| p-Aminobenzoic | mg | 0.1 |
| Pyridoxine hydrochloride | mg | 0.1 |
| Pyridoxal | mg | 0.02 |
| Ca-pantothenate | mg | 0.1 |
| Nicotinic acid | mg | 0.1 |
| Biotin | mg | 0.1 |
| Folic acid | mg | 1 |
| Distilled water | liters | 1 |

The pH value was adjusted to 7.2.

A 50 ml. batch of this medium was introduced into a 500 ml. shaking flask and sterilized by autoclaving at 115° C. for 10 minutes. The medium was inoculated with microorganisms described in Table VII and cultured at 30° C. with shaking.

After 4 days, the broth was assayed, and the L-proline content described in Table VII was found.

TABLE VII

| Microorganisms: | L-proline found, mg./l. |
|---|---|
| Pseudomonas ovalis strain 24–B | 3.8 |
| Candida tropicalis strain YO–129 | 4.8 |

EXAMPLE 18

A medium having the following composition was prepared:

| | | |
|---|---|---|
| Kerosene | g | 100 |
| NH$_4$Cl | g | 5 |
| Na$_2$HPO$_4$.12H$_2$O | g | 6.8 |
| KH$_2$PO$_4$ | g | 3.2 |
| MgSO$_4$.7H$_2$O | g | 0.5 |
| NaCl | g | 0.5 |
| Distilled water | liters | 1 |

The pH value was adjusted to 7.2.

A 50 ml. batch of this medium was introduced into a 500 ml. shaking flask and sterilized by autoclaving at 115° C. for 10 minutes.

The medium was inoculated with Corynebacterium hydrocarboclastus strain M–104.

Culture was carried out at 30° C. with shaking. After 4 days, the broth was assayed and the following amino acids were found:

| | Mg./l. |
|---|---|
| Glycine | 2.4 |
| L-methionine | 1.6 |
| L-proline | 4.1 |
| L-serine | 3.6 |

EXAMPLE 19

A medium having the composition described in Example 17 was prepared.

The medium was inoculated with the microorganisms listed below and cultured at 30° C. with shaking.

After 4 days, the several broths were assayed and the following amino acids were found:

*Candida tropicalis* YO-129:

| | Mg./l. |
|---|---|
| L-isoleucine | 7.0 |
| Glycine | 2.6 |
| L-methionine | 1.1 |
| L-serine | 3.9 |

*Corynebacterium olephilius*:

| | |
|---|---|
| Kp10-1399 isoleucine | 2.2 |
| Kp7-1428 glycine | 1.5 |

While the invention has been described with particular reference to specific embodiments, it is to be understood that it is not limited thereto, but is to be construed broadly and restricted solely by the scope of the appended claims.

What is claimed is:

1. A method of producing an amino acid which comprises culturing a microorganism under aerobic conditions on a medium containing a hydrocarbon as a principal source of assimilable carbon, and a source of assimilable nitrogen, and recovering said amino acid from said medium, said microorganism being capable of growing in any one of four media, the first medium consisting of 10 grams kerosene, 2 grams ammonium chloride, one gram disodium hydrogen phosphate dodekahydrate, 1.5 grams potassium dihydrogen phosphate, 0.5 gram magnesium sulfate heptahydrate, 2 grams sodium chloride, and sufficient distilled water to make one liter; the second medium consisting of 10 grams petroleum, 2.5 grams ammonium nitrate, one gram disodium hydrogen phosphate dodekahydrate, 1.5 grams potassium dihydrogen phosphate, 1.5 grams magnesium sulfate heptahydrate, 0.2 gram manganese chloride, traces each of calcium chloride, ferrous sulfate, and molybdenum sulfate, five grams calcium carbonate, and sufficient distilled water to make one liter; the third medium consisting of one gram ammonium chloride, 0.5 gram potassium dihydrogen phosphate, 0.2 gram magnesium sulfate, a trace of ferric chloride, sufficient water to make one liter, and being saturated with a mixture of equal parts of air and a compound selected from the group consisting of methane and propane; and the fourth medium consisting of any one of the first, second and third medium, and of at least one growth promoting agent selected from the group consisting of yeast extract, corn steep liquor, meat extract, peptone, protein hydrolyzate, and pastes and extracts prepared from crushed animal and vegetal tissue.

2. A method as set forth in claim 1, wherein said hydrocarbon is selected from the group consisting of kerosene, light petroleum oil, heavy petroleum oil, naphtha, ligroin, propane, butane, propylene, ethane, methane, and natural gas.

3. A method as set forth in claim 1, wherein said microorganism is selected from the group consisting of *Corynebacterium oleophilus* Kp6-1414, Kp7-1428, Kp10-1399, and Kp10;1452, *Corynebacterium hydrocarboclastus* S-155, S-179, M-104, M-134, A-137, and M-106, *Brevibacterium acetylicum* M-101, *Brevibacterium fulvum* A-34, *Brevibacterium albus* S-270, *Brevibacterium cerinus* K-129, *Achromobacter pestifer* S-175, *Pseudomonas ovalis* 24-(IAM-1522) and 8-05, *Escherichia coli* WM309-1, *Mycobacterium brevicale* p-128 and p-129, *Candida lipolytica* Y-6-4, Y-6-9, Y-6-10, Y-8-3, Y-8-4, and *Hansenula anomala* Y-32-5.

4. A method as set forth in claim 3, wherein said hydrocarbon is selected from the group consisting of kerosene, light petroleum oil, heavy petroleum oil, naphtha, ligroin, propane, butane, propylene, ethane, methane, and natural gas.

5. A method as set forth in claim 4, wherein said amino acid is a naturally occurring amino acid selected from the group consisting of alanine, aspartic acid, lysine, arginine, tyrosine, isoleucine, valine, phenylalanine, glycine, threonine, tryptophane, proline, serine, and glutamic acid.

6. A method as set forth in claim 1, wherein said amino acid is a naturally occurring amino acid selected from the group consisting of alanine, aspartic acid, lysine, arginine, tyrosine, isoleucine, valine phenylalanine, glycine, threonine, tryptophane, proline, serine, and glutamic acid.

References Cited by the Examiner

UNITED STATES PATENTS

| 2,697,061 | 12/1954 | Harris et al. | 195—1 |
| 3,087,863 | 4/1963 | Lee et al. | 195—47 |
| 3,096,252 | 7/1963 | Motozaki et al. | 195—47 |
| 3,131,131 | 4/1964 | Wehner | 195—28 X |

OTHER REFERENCES

Yamada et al., Agricultural and Biological Chemistry, 26, No. 9, page 636, September 1962.

Yamada et al., Agricultural and Biological Chemistry, 27, No. 5, pages 390-395, May 1963.

A. LOUIS MONACELL, *Primary Examiner.*